(12) United States Patent
Bekele

(10) Patent No.: US 6,479,162 B1
(45) Date of Patent: Nov. 12, 2002

(54) VINYLIDENE CHLORIDE POLYMER COMPOSITION AND FILM

(75) Inventor: Solomon Bekele, Taylors, SC (US)

(73) Assignee: Cryovac, Inc., Duncan, SC (US)

( * ) Notice: Subject to any disclaimer, the term of this patent is extended or adjusted under 35 U.S.C. 154(b) by 119 days.

(21) Appl. No.: 09/675,394

(22) Filed: Sep. 29, 2000

(51) Int. Cl.[7] .............................................. B32B 27/30
(52) U.S. Cl. ...................... 428/518; 428/522; 428/910; 525/239
(58) Field of Search .................... 525/239; 428/518, 428/522, 910

(56) References Cited

U.S. PATENT DOCUMENTS

| | | | |
|---|---|---|---|
| 3,953,557 A | | 4/1976 | Brax et al. ...................... 264/22 |
| 4,082,829 A | | 4/1978 | Brax et al. .................... 264/209 |
| 5,143,975 A | * | 9/1992 | Greenlee et al. ............. 525/194 |
| 5,191,007 A | * | 3/1993 | Zelazny et al. .............. 428/518 |
| 5,247,019 A | * | 9/1993 | Cozens et al. ............... 524/515 |
| 5,310,805 A | * | 5/1994 | Igarashi et al. .............. 524/297 |
| 5,446,101 A | | 8/1995 | Anazawa et al. ............ 525/239 |
| 5,679,465 A | | 10/1997 | Bekele ..................... 428/474.4 |

* cited by examiner

Primary Examiner—D. Lawrence Tarazano
(74) Attorney, Agent, or Firm—Mark B. Quatt

(57) ABSTRACT

A composition includes greater than 50% by weight such as between 51% and 99% by weight, of a first PVdC copolymer having a weight average molecular weight of between 80,000 and 125,000, and less than 50% by weight, such as between 1% and 49%, by weight of a second PVdC copolymer having a weight average molecular weight of between 126,000 and 180,000, the weight percent of each of the first and second polymers based on the combined weight of the first and second polymers. A film includes at least one layer having the above composition. A film can have at least one layer including a blend of a first vinylidene chloride polymer and a second vinylidene chloride polymer, the film having a free shrink ratio of between 0.6 and 2.2 at a shrink temperature of 180° F., or a free shrink ratio of between 0.8 and 1.4 at a shrink temperature of 200° F. Methods of making the film of the invention are also disclosed.

6 Claims, 4 Drawing Sheets

VINYLIDENE CHLORIDE POLYMER COMPOSITION AND FILM

FIELD OF THE INVENTION

The present invention relates to a vinylidene chloride polymer composition, and films made from the composition, including films suitable for the packaging of food products, such as meat.

BACKGROUND OF THE INVENTION

Thermoplastic packaging films made of vinylidene chloride polymer (herein referred to as "PVdC"), have been used for the packaging of food products such as fresh and processed meats and other items.

Multilayer, oriented, heat-shrinkable films including at least one layer containing PVdC have been produced by extrusion, coextrusion, lamination, and extrusion coating.

Chinese sausage is currently packaged in films such as monolayer films made up of a DOW 2032™ PVdC and formulated with plasticizers, heat stabilizers, antioxidants, UV absorbers, pigments, slip agents, antiblock agents, etc. Although this film offers good package color and thermal stability during extrusion of the packaging film, it exhibits a marginally stable trapped bubble, and a very narrow processing window, during orientation. As a result, manufacture of the film becomes a very difficult process in which bubble instability during orientation can easily occur. This can and does result in downtime from failure of the trapped bubble, or in processing speeds that are slower (and hence more expensive) than desirable to avoid such bubble failure.

An alternative PVdC copolymer, POVIDEN™ Type 2 PVdC having a weight average molecular weight of 130,000, and available from Kaustic of Volgograd, Russia, was tested by the applicant by extruding this material into a monolayer film and orienting the film. This was an effort to identify and provide a material which helps provide a more stable bubble process. However, it was found that although a more stable bubble process was obtained, this was at the expense of greater thermal instability during extrusion, leading to a film with too dark a color.

The applicant has now discovered that the composition disclosed herein, provides a combination of good thermal stability, color appearance, extrudability, orientability, Young's modulus, package firmness, and free shrink ratio properties in films of the invention, that is unavailable from either the DOW 2032 vinylidene chloride polymer alone, or the POVIDEN vinylidene chloride polymer alone.

SUMMARY OF THE INVENTION

A composition comprises greater than 50% by weight of a first vinylidene chloride polymer having a weight average molecular weight of between 80,000 and 125,000, and less than 50% by weight of a second vinylidene chloride polymer having a weight average molecular weight of between 126,000 and 180,000, the weight percent of each of the first and second polymers based on the combined weight of the first and second polymers.

A composition comprises between 51% and 99% by weight of a first vinylidene chloride polymer having a weight average molecular weight of between 80,000 and 125,000, and between 1% and 49% by weight of a second vinylidene chloride polymer having a weight average molecular weight of between 126,000 and 180,000, the weight percent of each of the first and second polymers based on the combined weight of the first and second polymers.

A film comprises at least one layer comprising a composition having greater than 50% by weight of a first vinylidene chloride polymer having a weight average molecular weight of between 80,000 and 125,000, and less than 50% by weight of a second vinylidene chloride polymer having a weight average molecular weight of between 126,000 and 180,000, the weight percent of each of the first and second polymers based on the combined weight of the first and second polymers.

A film comprises at least one layer comprising a composition having between 51% and 99% by weight of a first vinylidene chloride polymer having a weight average molecular weight of between 80,000 and 125,000, and between 1% and 49% by weight of a second vinylidene chloride polymer having a weight average molecular weight of between 126,000 and 180,000, the weight percent of each of the first and second polymers based on the combined weight of the first and second polymers.

A biaxially oriented film comprises at least one layer comprising a blend of a first vinylidene chloride polymer and a second vinylidene chloride polymer, the film having a free shrink ratio of between 0.6 and 2.2 at a shrink temperature of 180° F.

A biaxially oriented film comprises at least one layer comprising a blend of a first vinylidene chloride polymer and a second vinylidene chloride polymer, the film having a free shrink ratio of between 0.8 and 1.4 at a shrink temperature of 200° F.

Definitions

"vinylidene chloride polymer" and "PVdC" herein refer to a vinylidene chloride-containing polymer or copolymer, i.e., a polymer that includes monomer units derived from vinylidene chloride ($CH_2=CCl_2$) and also, optionally, monomer units derived from one or more of vinyl chloride, styrene, vinyl acetate, acrylonitrile, and $C_1$–$C_{12}$ alkyl esters of (meth)acrylic acid (e.g., methyl acrylate, butyl acrylate, methyl methacrylate, etc.). Thus, "vinylidene chloride polymer" and "PVdC" include one or more of vinylidene chloride homopolymer, vinylidene chloride/vinyl chloride copolymer, vinylidene chloride/methyl acrylate copolymer, vinylidene chloride/acrylonitrile copolymer, vinylidene chloride/butyl acrylate copolymer, vinylidene chloride/styrene copolymer, and vinylidene chloride/vinyl acetate copolymer. The weight percent of the vinylidene chloride monomer can be between 75% and 95% by weight of the copolymer; the weight percent of the second monomer, e.g. vinyl chloride, can be between 5% and 25% by weight of the copolymer;

"(meth)acrylic acid" herein refers to both acrylic acid and/or methacrylic acid;

"(meth)acrylate" herein refers to both acrylate and methacrylate;

"polymer" herein refers to the product of a polymerization reaction, and is inclusive of homopolymers, copolymers, terpolymers, tetrapolymers, etc.;

"copolymer" herein refers to a polymer formed by the polymerization reaction of at least two different monomers and is inclusive of random copolymers, block copolymers, graft copolymers, etc.;

"ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, ESCORENE™ or EXCEED™ resins supplied by Exxon; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers;

"package" herein refers to a film configured around a product;

"film" herein refers to plastic web materials having a thickness of 0.50 mm (20 mils) or less such as 0.25 mm (10 mils) or less;

"inner layer" herein refers to any layer of a multilayer film having both of its principal surfaces directly adhered to another layer of the film;

"outer layer" herein refers to any layer of a film having only one of its principal surfaces directly adhered to another layer of the film;

"seal layer" herein refers to a layer of a film that can be involved in the sealing of the film to itself or another layer;

"seal" herein refers to a bonding of a first film surface to a second film surface created by heating (e.g., by means of a heated bar, hot air, infrared radiation, ultrasonic sealing, etc.) the respective surfaces to at least their respective seal initiation temperatures;

"barrier" herein refers to a layer of a film that can significantly retard the transmission of one or more gases (e.g., $O_2$);

"abuse layer" herein refers to a layer of a film that can resist abrasion, puncture, and/or other potential causes of reduction of package integrity, and/or potential causes of reduction of package appearance quality;

"tie layer" herein refers to a layer of a film that can provide interlayer adhesion to adjacent layers that include otherwise nonadhering or weakly adhering polymers;

"bulk layer" herein refers to a layer of a film that can increase the abuse resistance, toughness, or modulus of a film;

"lamination" herein refers to the bonding of two or more film layers to each other, e.g. by the use of polyurethane adhesive;

"total free shrink" means the percent dimensional change in a 10 cm×10 cm specimen of film, when shrunk at a specified test temperature such as 85° C. (185° F.), with the quantitative determination being carried out according to ASTM D 2732, as set forth in the 1990 Annual Book of ASTM Standards, vol. 08.02, 368–371, the entire disclosure of which is incorporated herein by reference. "Total free shrink" refers to the totality of the free shrink in both the longitudinal direction and the transverse direction.

"free shrink ratio" is the ratio of the free shrink of a given film, at a given temperature, in the longitudinal direction, to the free shrink of the same film, at the same temperature, in the transverse direction;

"machine direction" herein refers to the direction along the length of a film, i.e., in the direction of the film as it is formed during extrusion and/or coating; and "transverse direction" herein refers to the direction across a film, i.e., the direction that is perpendicular to the machine direction.

All compositional percentages used herein are presented on a "by weight" basis, unless designated otherwise.

BRIEF DESCRIPTION OF THE DRAWINGS

A detailed description of embodiments of the invention follows, with reference to the attached drawings, wherein.

DETAILED DESCRIPTION OF THE INVENTION

The first vinylidene chloride polymer can be a suspension polymerized or emulsion-polymerized vinylidene chloride polymer.

The second vinylidene chloride polymer can be a suspension polymerized or emulsion-polymerized vinylidene chloride polymer.

The film of the present invention can be a monolayer film, or can include two or more layers.

If the film has two or more layers, at least one layer comprises the above described blend of PVdC resins, and at least one other layer comprises an olefinic polymer or copolymer.

A three layer film can include, in order, a seal layer, an oxygen barrier layer of the above-described PVdC blend, and an abuse layer.

A four layer film can be like the three layer film, and also include a bulk layer disposed between the seal layer and the oxygen barrier layer.

If desired, tie layers can be disposed between the seal layer and the bulk layer and/or between the oxygen barrier layer and the abuse layer.

The PVdC-containing layer can be an outer layer, or an inner layer of the film. If the blend composition is present in an inner film layer, the multilayer film can comprise outer surface layers that both include an olefinic polymer.

For layers of a multilayer film other than the layer or layers that contain the PVdC blend, suitable polymers include olefinic materials such as those having monomer units derived from ethylene and, optionally, monomer units derived from at least one of a $C_4$–$C_{12}$ alpha-olefin, vinyl acetate, (meth)acrylic acid, and a $C_1$–$C_{12}$ alkyl ester of (meth)acrylic acid. Examples include low density polyethylene (LDPE), LLDPE, VLDPE, homogeneous ethylene/alpha-olefin copolymer, and ionomer.

Figure 1:
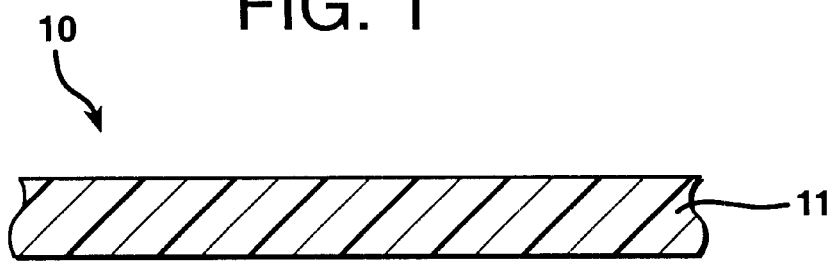
FIG. 1 is a schematic cross-section of a monolayer film.

The film can be cross-linked or non-cross-linked, oriented or unoriented, heat shrinkable or non-heat shrinkable. Where the film is heat shrinkable, it has a total free shrink at 85° C. (185° F.) of between 10 and 100%. All or a portion of the film of the present invention can be irradiated to induce crosslinking. In the irradiation process, the film is subjected to an energetic radiation treatment, such as corona discharge, plasma, flame, ultraviolet, X-ray, gamma ray, beta ray, and high energy electron treatment, which induces crosslinking between molecules of the irradiated material. The proper dosage level can be determined by standard dosimetry methods known to those of ordinary skill in the art, and the precise amount of radiation to be used is of course dependent on the particular film structure and its end use. The film can be irradiated at a level of from 0.5–15 megarads (MR), such as 1–12 MR. Further details on the irradiation of polymeric films can be found in, for example, U.S. Pat. Nos. 4,064,296 (Bornstein et al.), 4,120,716 (Bonet), and 4,879,430 (Hoffman), all incorporated herein by reference in their entirety. Extrusion coating can be used as a method of avoiding irradiation of the PVdC. A substrate can be extruded and irradiated, and the PVdC can be applied to the irradiated substrate by an extrusion coating process FIG. 1 shows a monolayer film 10 having a single layer 11.

Layer 11 comprises greater than 50% by weight of a first vinylidene chloride polymer having a weight average molecular weight of between 80,000 and 125,000, and less than 50% by weight of a second vinylidene chloride polymer having a weight average molecular weight of between 126,000 and 180,000, the weight percent of each of the first and second polymers based on the combined weight of the first and second polymers. Layer 11 can comprise between about 51% to 99% by weight of a first vinylidene chloride polymer having a weight average molecular weight of between 80,000 and 125,000, and between about 1% to 49% by weight of a second vinylidene chloride polymer having a weight average molecular weight of between 126,000 and 180,000, the weight percent of each of the first and second polymers based on the combined weight of the first and second polymers.

A commercial example of the first vinylidene chloride polymer is DOW™ 2032 having a weight average molecular weight of 110,000, and available from Dow Chemical Company.

A commercial example of the second vinylidene chloride polymer is POVIDEN™ Type 2 PVdC having a weight average molecular weight of 130,000, and available from Kaustic of Volgograd, Russia.

Figure 2:
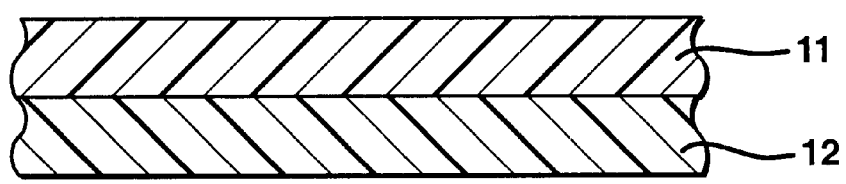
FIG. 2 is a schematic cross-section of a two layer film.

FIG. 2 shows a two layer film 10 having a layer 11 and a layer 12.

Layer 11 can comprise the blend disclosed above for layer 11 of FIG. 1.

Layer 12 can comprise any suitable polymeric material, such as a thermoplastic polymeric material, such as an olefinic polymer, such as an ethylenic polymer, such as an ethylenic homopolymer or copolymer, such as ethylene/alpha-olefin copolymer, such as heterogeneous or homogeneous ethylene/alpha-olefin copolymers.

Layer 12 can comprise an olefinic polymer or copolymer such as ethylene/vinyl acetate copolymer; ethylene/alkyl acrylate copolymer; ethylene/(meth)acrylic acid copolymer; ionomer; propylene homopolymer and copolymer; and butylene homopolymer and copolymer.

Blends of any of the herein disclosed materials for layer 12 can be included in layer 12.

Figure 3:
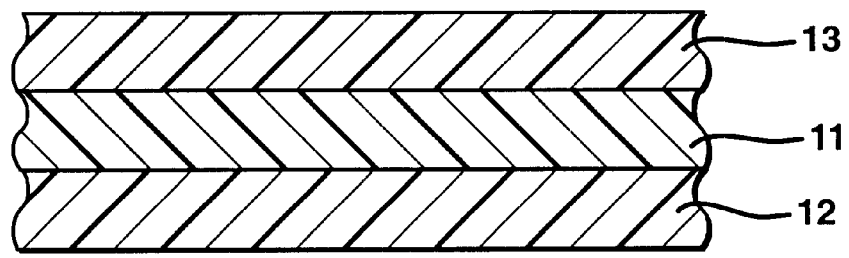
FIG. 3 is a schematic cross-section of a three layer film.

FIG. 3 shows a three layer film 10 having a layers 11, 12, and 13.

Layer 11 can comprise the blend disclosed above for layer 11 of FIG. 1.

Layers 12 and 13 can comprise any of the polymers disclosed above for layer 12 of FIG. 2.

Layers 12 and 13 can be the same, or can be different. The difference can be in composition, in one or more physical properties, in thickness, in amount or type of additives, in degree of crosslinking or orientation, or the like. For example, layer 12 can comprise an ethylene/vinyl acetate with 6% vinyl acetate, while layer 13 can comprise an ethylene/vinyl acetate with 9% vinyl acetate. As another example, layer 12 can comprise an ethylene/vinyl acetate with 6% vinyl acetate, while layer 13 can comprise an ethylene/alpha-olefin copolymer. Film structures in accordance with the invention can thus be depicted as A/B/A or as A/B/C, where A, B, and C each represent a distinct layer of a multilayer film.

Processing aids can be used as desired in one or more layers of films of the invention. In one embodiment, in addition to the blend of the first and second PVdC materials, the composition of the invention includes 0.3%, by weight of the total composition, of a red pigment (VULCAN FAST RED B™) available from Clariant Corporation of Charlotte, N.C.; between 0.05 and 0.20%, by weight of the total composition, of a fatty bisamide (KEMAMIDE W-20™) available from Witco Chemical, Humko Division of Memphis, Tenn.; and between 0.10 and 0.30%, by weight of the total composition, of an amorphous silica (SYLOBLOC™ 44 OR 47) available from Grace Davison of Baltimore, Md. The composition can also include between 2 and 10%, by weight of the total composition, of a plasticizer such as phthalate, epoxy, ester of aliphatic dibasic acid, phosphate, polyester, or a blend of two or more of these or other plasticizers. Films with more than three layers can be made, and can include bulk, sealing, adhesive layers, and the like.

Regardless of the individual amounts used, the components of the blend can be mixed in, for example, a blender or extruder. Once mixed, the blend can be extruded and processed in any of a number of methods known to those of ordinary skill in the art so as to form a film or a layer of a multilayer film, for example, by the methods disclosed in U.S. Pat. Nos. 3,741,253 (Brax et al.), 4,278,738 (Brax et al.), and 4,284,458 (Schirmer) all incorporated herein by reference in their entirety. Thus, any suitable method of making a film having an oxygen barrier layer can be used to make a film in accordance with the present invention, so long as the method utilizes an above-described PVdC-containing composition. Suitable methods include tubular cast coextrusion, such as that shown in U.S. Pat. No. 4,551,380 [Schoenberg], herein incorporated by reference in its entirety, tubular or flat cast extrusion, or blown bubble extrusion (for monolayer films) or coextrusion (for multilayer films) by techniques well known in the art. Multilayer films can be made by coextrusion, extrusion coating, extrusion lamination, corona bonding or conventional lamination of all the film layers.

The film can be quenched, and optionally irradiated by chemical means or electron beam irradiation, for example at a dosage of between 20 and 35 kiloGrays.

The film can be optionally reheated to its orientation temperature, and then optionally stretched by a conventional trapped bubble or a simultaneous or sequential tenter frame process at a ratio of between 2:1 and 5:1 in either or both of the longitudinal and transverse directions.

Bags made from the film can be made by any suitable process, such as that shown in U.S. Pat. No. 3,741,253 (Brax et al.), hereby incorporated by reference in its entirety. Side or end sealed bags can be made from single wound or double wound films.

Film of the present invention can have any total thickness desired, so long as the film provides the desired properties for the intended end use. Thicknesses can range from 0.1 to 20 mils, such as 0.3 to 15 mils, 0.5 to 10 mils, 0.7 to 5 mils, 1.0 to 3 mils, and 1.3 to 2 mil.

Film of the present invention can have greater than 50% by weight, such as greater than 55%, greater than 60%, greater than 65%, greater than 70%, greater than 75%, greater than 80%, greater than 85%, greater than 90%, and greater than 95% of the first vinylidene chloride polymer, and less than 50% by weight, such as less than 45%, less than 40%, less than 35%, less than 30%, less than 25%, less than 20%, less than 15%, less than 10%, and less than 5%, of the second vinylidene chloride polymer, the weight percent of each of the first and second polymers based on the combined weight of the first and second polymers.

Film of the present invention can have between 51% and 99% by weight, such as between 55% and 95%, between 60% and 90%, between 65% and 85%, and between 70% and 80%, of the first vinylidene chloride polymer, and between 1% and 49% by weight, such as between 5% and 45%, between 10% and 40%, between 15% and 35%, and between 20% and 30%, of the second vinylidene chloride polymer, the weight percent of each of the first and second polymers based on the combined weight of the first and second polymers.

Films of the invention comprise a first vinylidene chloride polymer that can have a $M_w$ of at least 80,000, such as at least 90,000, at least 100,000, at least 110,000, and at least 120,000; and a second vinylidene chloride polymer that can have a $M_w$ of at least 126,000, such as at least 130,000, at least 140,000, at least 150,000, and at least 170,000.

Films of the invention comprise a first vinylidene chloride polymer that can have a $M_w$ of between 80,000 and 125,000, such as between 85,000 and 123,000, between 90,000 and 120,000, and between 95,000 and 115,000; and a second vinylidene chloride polymer that can have a $M_w$ of between 126,000 and 180,000, such as between 130,000 and 170,000, and between 140,000 and 160,000.

EXAMPLE 1

60%, by weight of the total blend, of a first vinylidene chloride polymer (Dow 2032) was blended with 40%, by weight of the total blend, of a second vinylidene chloride polymer (POVIDEN™ Type 2 PVdC) in a low shear blender, and in another example in a high shear blender. Blending speed and time were selected to achieve a substantially homogeneous mix.

EXAMPLE 2

65%, by weight of the total blend, of a first vinylidene chloride polymer (Dow 2032) was blended with 35%, by weight of the total blend, of a second vinylidene chloride polymer (POVIDEN™ Type 2 PVdC) in a low shear blender, and in another example in a high shear blender. Blending speed and time were selected to achieve a substantially homogeneous mix.

EXAMPLE 3

70%, by weight of the total blend, of a first vinylidene chloride polymer (Dow 2032) was blended with 30%, by weight of the total blend, of a second vinylidene chloride polymer (POVIDEN™ Type 2 PVdC) in a low shear blender, and in another example in a high shear blender. Blending speed and time were selected to achieve a substantially homogeneous mix.

EXAMPLE 4

75%, by weight of the total blend, of a first vinylidene chloride polymer (Dow 2032) was blended with 25%, by weight of the total blend, of a second vinylidene chloride polymer (POVIDEN™ Type 2 PVdC) in a low shear blender, and in another example in a high shear blender. Blending speed and time were selected to achieve a substantially homogeneous mix.

EXAMPLE 5

80%, by weight of the total blend, of a first vinylidene chloride polymer (Dow 2032)was blended with 20%, by weight of the total blend, of a second vinylidene chloride polymer (POVIDEN™ Type 2 PVdC) in a low shear blender, and in another example in a high shear blender. Blending speed and time were selected to achieve a substantially homogeneous mix.

Each of the blends of Examples 1 to 5 was extruded and processed as follows. The respective blend was downwardly extruded through a tubular extrusion die, then advanced through a set of nip rolls and quenched down to a temperature of between 5° C. and 20° C. in a water quench tank, then advanced through another set of nip rolls and reheated up to a temperature of between 20° C. and 40° C., then inflated and biaxially oriented in a trapped bubble orientation system, then collapsed on itself and annealed to reduce the lower temperature free shrink of the resulting film. Thus:

EXAMPLE 6

The blend of Example 1 was extruded by tubular extrusion and processed, as disclosed immediately above, into a monolayer biaxially oriented film having a total thickness (of the collapsed, oriented film) of 1.60 mils.

EXAMPLE 7

The blend of Example 2 was extruded by tubular extrusion and processed, as in Example 6, into a monolayer biaxially oriented film having a thickness of 1.60 mils.

EXAMPLE 8

The blend of Example 3 was extruded by tubular extrusion and processed, as in Example 6, into a monolayer biaxially oriented film having a thickness of 1.60 mils.

EXAMPLE 9

The blend of Example 4 was extruded by tubular extrusion and processed, as in Example 6, into a monolayer biaxially oriented film having a thickness of 1.60 mils.

EXAMPLE 10

The blend of Example 5 was extruded by tubular extrusion and processed, as in Example 6, into a monolayer biaxially oriented film having a thickness of 1.60 mils.

The following additional examples of a film of the invention are made by tubular coextrusion, and by extrusion coating. In the latter case, a substrate is extruded or coextruded, optionally irradiated, then optionally stretch oriented; and then a layer of a blend of PVdC as disclosed herein is extrusion coated, optionally with at least one additional layer, to the substrate.

TABLE 1

| Example | Film Structure | Example | Film Structure | Example | Film Structure |
|---|---|---|---|---|---|
| 11 | A1/B | 21 | B/A1/B | 31 | C/A1/B |
| 12 | A2/B | 22 | B/A2/B | 32 | C/A2/B |
| 13 | A3/B | 23 | B/A3/B | 33 | C/A3/B |
| 14 | A4/B | 24 | B/A4/B | 34 | C/A4/B |
| 15 | A5/B | 25 | B/A5/B | 35 | C/A5/B |
| 16 | A1/C | 26 | C/A1/C | 36 | C/A1/D/C |
| 17 | A2/C | 27 | C/A2/C | 37 | C/A2/D/C |
| 18 | A3/C | 28 | C/A3/C | 38 | C/A3/D/C |
| 19 | A4/C | 29 | C/A4/C | 39 | C/A4/D/C |
| 20 | A5/C | 30 | C/A5/C | 40 | C/A5/D/C |

In Table 1:
  A1=blend of PVdC of Example 1.
  A2=blend of PVdC of Example 2.
  A3=blend of PVdC of Example 3.
  A4=blend of PVdC of Example 4.
  A5=blend of PVdC of Example 5.
  B=ethylene/alpha-olefin copolymer.
  C=ethylene/vinyl acetate copolymer.
  D=bulk layer of an ethylenic copolymer.

Figure 4:
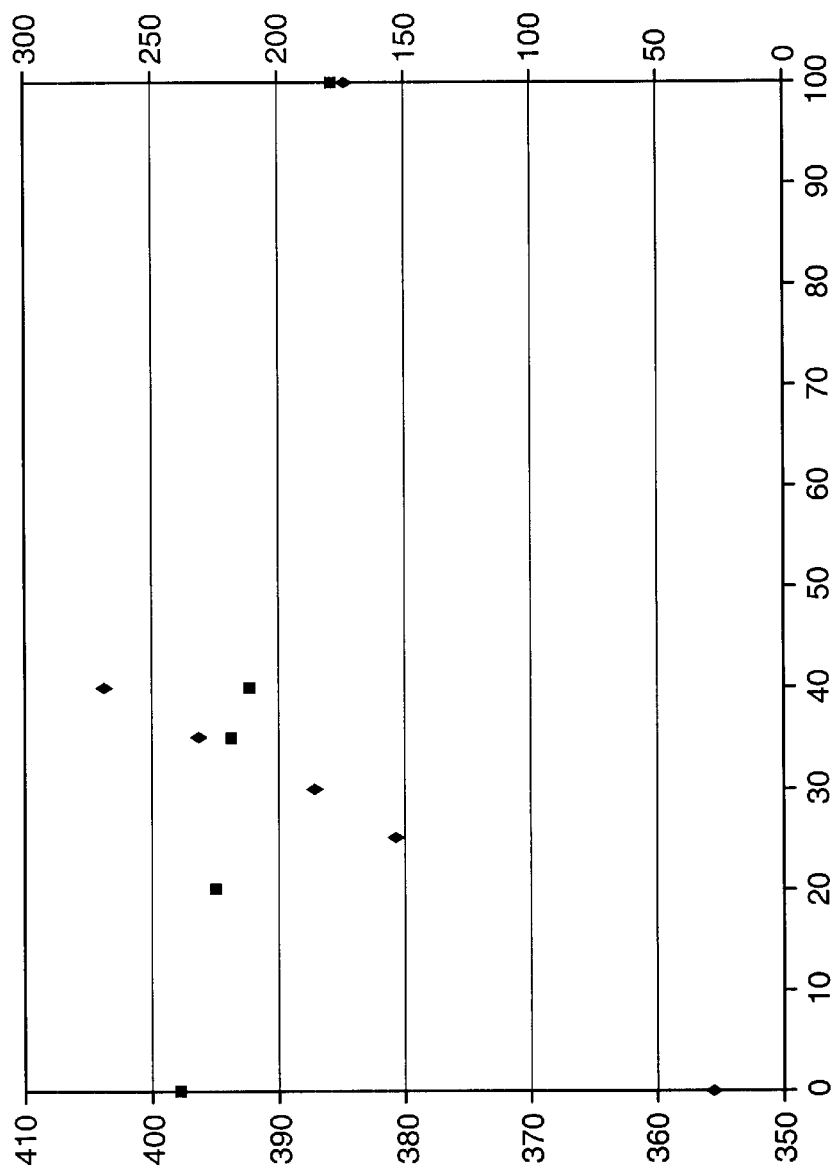
FIG. 4 is a graph showing certain properties of biaxially oriented monolayer films as a function of the blend ratio.

FIG. 4 shows a graph reflecting several Examples of a film of the invention. The graph demonstrates the average Young's modulus (AS™ D 882–95) (left side of the graph) and oxygen transmission rate (ASTM D 3985–95) (right side of the graph) as a function of the percent, in the PVdC blend of the invention, of the second vinylidene chloride polymer having a molecular weight of 130,000 (abscissa of the graph). The square shaped points represent the oxygen transmission rate of samples in units of cc/day.square meter. MPa. The diamond shaped points represent the Young's modulus in units of MPa.

Table 2 below tabulates the above properties for the Examples of FIG. 4.

TABLE 2

| | % of Second Component in Blend | Ave. 4% Young's Modulus, MPa | OTR, cc/day. sq. m. MPa |
|---|---|---|---|
| Comparative Example 1 | 0 | 355.5 | 239.1 |
| Example 10 | 20 | — | 226 |
| Example 9 | 25 | 380.7 | — |
| Example 8 | 30 | 387.5 | — |
| Example 7 | 35 | 396.6 | 220 |
| Example 6 | 40 | 404 | 213 |
| Comparative Example 2 | 100 | 385 | 179 |

The inventor has found that the disclosed blends of the invention offer a combination of good thermal stability, color appearance, extrudability, orientability, free shrink ratio, and Young's modulus, in films of the invention, that is unavailable from either the first vinylidene chloride polymer alone, or the second vinylidene chloride polymer alone.

Figure 5:
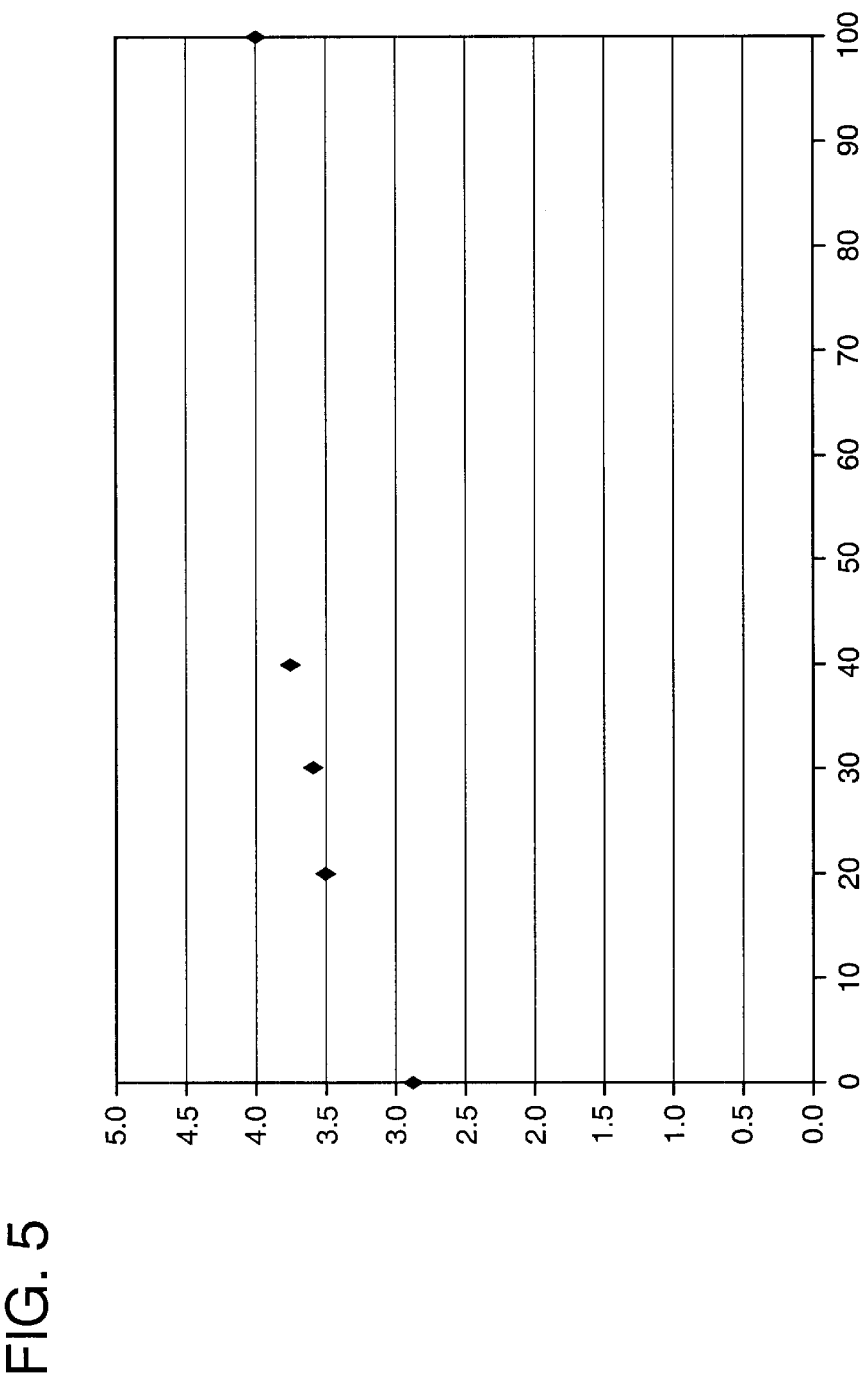
FIG. 5 is a graph showing retorted package firmness of packages made from biaxially oriented monolayer films as a function of the blend ratio.

FIG. 5 shows a graph reflecting several Examples of a film of the invention. The graph demonstrates the relative retorted package firmness (left side of the graph) as a function of the weight percent, in the PVdC blend of the invention, of the second vinylidene chloride polymer having a molecular weight of 130,000 (abscissa of the graph). The diamond shaped points represent the relative package firmness.

Package firmness was determined as follows. Films of the invention were filled with a Chinese sausage mixture. The mixture consisted of pork, flour, water, and flavoring. Each sausage was made in a conventional process by running the film through a vertical form/fill machine, forming the film into a tube, creating a lap or fin longitudinal seal, filling the tube with the sausage mixture, clipping both ends with metal clips, and running the filled and closed tubes through a horizontal steam retort system. Temperature of the packaged sausage was ramped up over a 20 minute period to between 121° C. and 125° C. The temperature of the sausage was then held for about 20 minutes at between 121° C. and 125° C. The temperature of the sausage was then cooled over the next 20 minutes to between 45° C. and 65° C. The result is a shelf-stable packaged sausage product.

To determine package firmness, a panel of 4 to 6 people evaluated each package for firmness, by visual observation and feel. Also, the length of each package was measured (a longer package being considered more desirable than a short package). A score of 5 is excellent; a score of 1 is poor.

Table 3 below tabulates the package firmness test results for the films indicated in the Table.

TABLE 3

| | % of Second Component in Blend | Package Firmness |
|---|---|---|
| Comparative Example 1 | 0 | 2.9 |
| Example 10 | 20 | 3.5 |
| Example 8 | 30 | 3.6 |
| Example 6 | 40 | 3.8 |
| Comparative Example 2 | 100 | 4 |

Figure 6:
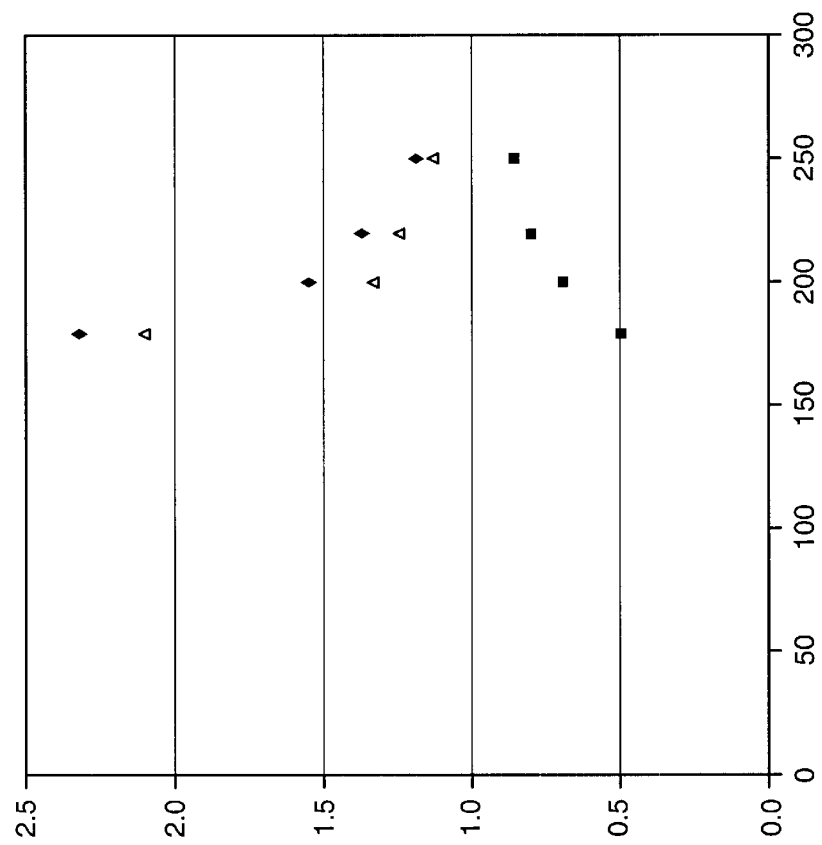
FIG. 6 is a graph showing free shrink ratio of a biaxially oriented monolayer film of the invention, and comparative films, as a function of shrink temperature.

FIG. 6 shows a graph reflecting an example of a film of the invention, and two comparative films. The graph demonstrates the free shrink ratio (left side of the graph) as a function of the shrink temperature (abscissa of the graph).

The triangle shaped points represent the free shrink ratio of a biaxially oriented mono-layer film of the invention (Example 7), comprising a blend of 65%, by weight of the blend, of Dow2032™; and 35%, by weight of the blend, of POVIDEN TYPE 2™, the free shrink ratio plotted at four free shrink temperatures.

The diamond shaped points represent the free shrink ratio of a comparative biaxially oriented monolayer film, made up of Dow2032™, the free shrink ratio plotted at the same four free shrink temperatures.

The square shaped points represent the free shrink ratio of another comparative biaxially oriented monolayer film, made up of POVIDEN TYPE 2™, the free shrink ratio plotted at the same four free shrink temperatures.

Table 4 below tabulates the above properties for the films just described.

TABLE 4

| | Free shrink ratio | | |
|---|---|---|---|
| Free Shrink Temperature, deg. F | DOW 2032 | POVIDEN II | DOW 2032/POVIDEN II: 65%/35% |
| 180 | 2.33 | 0.5 | 2.11 |
| 200 | 1.56 | 0.69 | 1.34 |
| 220 | 1.38 | 0.8 | 1.25 |
| 250 | 1.19 | 0.86 | 1.14 |

It is believed that too high a free shrink ratio at a given temperature, as is present with the comparative example made up of the DOW 2032™ material, results in package looseness;

but that too low a free shrink ratio at a given temperature, as is present with the comparative example made up of the POVIDEN II™ material, results in package tightness to the point that the lap or fin longitudinal seal of the package can fail in use. Too loose a package is aesthetically undesirable to the end user; too tight a package, with seal failure, can compromise the integrity of the packaged product.

Thus, a biaxially oriented film of the invention can comprise at least one layer comprising a blend of the first vinylidene chloride polymer of the invention and the second vinylidene chloride polymer of the invention, the film having a free shrink ratio of between 0.6 and 2.2, such as between 0.8 and 2.0, such as between 1.0 and 1.8, such as between 1.2 and 1.6, at a shrink temperature of 180° F.

A biaxially oriented film of the invention can comprise at least one layer comprising a blend of a first vinylidene chloride polymer and a second vinylidene chloride polymer, the film having a free shrink ratio of between 0.8 and 1.4, such as between 1.0 and 1.2, at a shrink temperature of 200° F.

All values for a given physical property, composition, or the like, including ranges, subranges thereof, and any specific values disclosed herein in the examples, are interchangeable with each other, and are deemed as disclosed herein with respect to alternative subranges for that physical property or composition. Thus, by way of example, a composition of the invention can include between 55 and 70% of a first vinylidene chloride polymer.

Although the present invention has been described in connection with certain preferred embodiments, modifications may be practiced within the scope of the following claims.

What is claimed is:

1. A composition comprising between 55% and 95 by weight of a first vinylidene chloride polymer having a weight average molecular weight of between 80,000 and 125,000, and between 5% and 45% by weight of a second vinylidene chloride polymer having a weight average molecular weight of between 126,000 and 180,000, the weight percent of each of the first and second polymers based on the combined weight of the first and second polymers.

2. A film comprising;
   a) a first layer comprising an olefinic polymer or copolymer; and
   b) a second layer comprising a composition having greater than 50% by weight of a first vinylidene chloride polymer having a weight average molecular weight of between 80,000 and 125,000, and less than 50% by weight of a second vinylidene chloride polymer having a molecular weight of Keen 126,000 and 180,000, the weight percent of each of the first and second polymers based on the combined weight of the first and second polymers.

3. The film of claim 2 wherein the olefinic polymer or copolymer comprises an ethylenic polymer or copolymer.

4. The film of claim 2 wherein the ethylene polymer or copolymer comprises a material selected from low density polyethylene, medium density polyethylene, high density polyethylene, ethylene/alpha-olefin copolymer, ethylene/vinyl acetate copolymer, ethylene/alkyl acrylate copolymer, ethylene/(meth)acrylic acid copolymer, ionomer, propylene homopolymer and copolymer, and butylene homopolymer and copolymer.

5. A biaxially oriented film comprising at least one layer comprising a blend of a first vinylidene chloride polymer and a second vinylidene chloride polymer, the film having a free shrink ratio of between 0.6 and 2.2 at a shrink temperature of 180° F.

6. A biaxially oriented film comprising at least one layer comprising a blend of a first vinylidene chloride polymer and a second vinylidene chloride polymer, the film having a free shrink ratio of between 0.8 and 1.4 at a shrink temperature of 200° F.

* * * * *

UNITED STATES PATENT AND TRADEMARK OFFICE
CERTIFICATE OF CORRECTION

PATENT NO.     : 6,479,162 B1
DATED          : November 12, 2002
INVENTOR(S)    : Solomon Bekele It is certified that error appears in the above-identified patent and that said Letters Patent is hereby corrected as shown below:

Column 11,
Line 34, "95" should read -- 95% --.

Column 12,
Line 13, "Keen" should read -- between --.
Line 19, "ethylene" should read -- ethylenic --.

Signed and Sealed this

First Day of July, 2003

JAMES E. ROGAN
*Director of the United States Patent and Trademark Office*